United States Patent [19]

Sada

[11] Patent Number: 5,685,168
[45] Date of Patent: Nov. 11, 1997

[54] REFRIGERATING APPARATUS

[75] Inventor: Shinri Sada, Osaka, Japan

[73] Assignee: Daikin Industries, Ltd., Japan

[21] Appl. No.: 596,370

[22] PCT Filed: Jun. 21, 1995

[86] PCT No.: PCT/JP95/01231

§ 371 Date: Feb. 22, 1996

§ 102(e) Date: Feb. 22, 1996

[87] PCT Pub. No.: WO96/00873

PCT Pub. Date: Jan. 11, 1996

[30] Foreign Application Priority Data

Jun. 29, 1994  [JP]  Japan ..................... 6-147855

[51] Int. Cl.⁶ .................... F25B 1/10; F25B 43/02
[52] U.S. Cl. .................... 62/473; 62/510; 417/228
[58] Field of Search ............... 62/510, 193, 473; 417/228

[56] References Cited

U.S. PATENT DOCUMENTS 3,581,519  6/1971  Garrett, Jr. et al. ............... 417/228
5,586,450  12/1996  Tollar et al. ..................... 62/510 X

FOREIGN PATENT DOCUMENTS 4222353  8/1992  Japan .
5-296583  11/1993  Japan .
7-103584  4/1995  Japan .

*Primary Examiner*—William E. Wayner
*Attorney, Agent, or Firm*—Sixbey, Friedman, Leedom & Ferguson, P.C.; Gerald J. Ferguson, Jr.; Tim L. Brackett, Jr.

[57] ABSTRACT

In a refrigerating apparatus having a compression mechanism (21), an outdoor heat exchanger (24), an outdoor motor-operated expansion valve (25) and an indoor heat exchanger (32), the compression mechanism (21) is so composed that two compressors (2a, 2b) are connected in parallel with each other. Each compressor (2a, 2b) is provided with an oil discharge mechanism (40) for discharging, when lubricating oil stored in its casing exceeds a set amount, the lubricating oil.

11 Claims, 14 Drawing Sheets

1
REFRIGERATING APPARATUS

[TECHNICAL FIELD]

This invention relates to a refrigerating apparatus having a plurality of compressors and particularly relates to controls of lubricating oil.

[BACKGROUND ART]

There has been a conventional air conditioner as a refrigerating apparatus having a refrigerating circuit in which two compressors are connected in parallel with each other, as disclosed in the Japanese Patent Application Laid-Open Gazette No.4-222353. In this air conditioner, an oil equalizing pipe is connected between casings of both the compressors, and the pressure loss of a suction pipe of the first compressor is set larger than that of the second compressor so that the first compressor forms a low-pressure dome.

When both the compressors are operated, lubricating oil flows from the second compressor to the first compressor through the oil equalizing pipe so that an amount of lubricating oil is approximately equalized between both the compressors thereby preventing lack in lubricating oil.
Problems to be Solved In the above-mentioned air conditioner, differential pressure is forcedly generated between both the compressors. The differential pressure results from a difference in pressure loss between the suction pipes of the compressors.

In the above forced differential pressure manner, however, the pressure loss is positively charged so that a COP (coefficient of performance) is reduced.

Further, since the suction pipes of the compressors are mounted at the site of installation, it is impossible to precisely generate differential pressure between both the compressors. In detail, the generated differential pressure is too large or too small, so that the oil equalization function of equalizing an amount of lubricating oil cannot sufficiently be displayed thereby causing lack in lubricating oil.

This invention has been made in view of the foregoing problems and has its object of securely equalizing an amount of lubricating oil while enhancing a COP.

[DISCLOSURE OF INVENTION]

In order to attain the above object, this invention takes measures of providing a compression mechanism with an oil discharge mechanism.
Constitution More specifically, as shown in FIG. 1, a measure taken in the invention according to claim 1 first premises a refrigerating apparatus comprising a compression mechanism (21), a thermal-source-side heat exchanger (24), an expansion mechanism (25) and a used-side heat exchanger (32).

Further, the compression mechanism (21) is so composed that a plurality of compressors (2a, 2b, ...) are connected in parallel with one another.

In addition, each of the compressors (2a, 2b, ...) is provided with an oil discharge mechanism (40) for discharging, when lubricating oil stored in a casing of the compressor exceeds a set amount, the excess of lubricating oil.

In a measure taken in the invention according to claim 2, as shown in FIG. 7, there is provided a plurality of thermal source units (2A, 2B, ...) which each have at least a compression mechanism (21) and a thermal-source-side heat exchanger (24) and are connected in parallel with one another. Further, there is provided a user unit (3A) which has 2
at least a used-side heat exchanger (32) and is connected to the respective thermal source units (2A, 2B, ...). Furthermore, the measure premises a refrigerating apparatus in which refrigerant discharged from the compression mechanism (21) is condensed by one of the heat exchangers (24, 32), is expanded by the expansion mechanism (25) and is then evaporated by the other heat exchanger (24, 32).

In addition, each of the compression mechanisms (21, 21, ...) is provided with an oil discharge mechanism (40) for discharging, when lubricating oil stored in the compression mechanism (21) exceeds a set amount, the excess of lubricating oil.

A measure taken in the invention according to claim 3 is so composed that in the invention of claim 2, each of the compression mechanisms (21, 21, ...) has a single compressor (2a) provided with the oil discharge mechanism (40).

As shown in FIG. 8, a measure taken in the invention according to claim 4 is so composed that in the invention of claim 2, the compression mechanism (21) of at least one thermal source unit (2A) has a plurality of compressors (2a, 2b, ...) connected in parallel with one another.

A measure taken in the invention according to claim 5 is so composed that in the invention of claim 4, the compression mechanism (21) having the plural compressors (2a, 2b, ...) includes a differential pressure control mechanism (4a) which has an oil equalizing pipe (45) connecting the respective compressors (2a, 2b, ...) and in which differential pressure is generated among the respective compressors (2a, 2b, ...) thereby equalizing an amount of lubricating oil thereamong.

A measure taken in the invention according to claim 6 is so composed that in the invention of claim 5, the compression mechanism (21) having the plural compressors (2a, 2b, ...) includes the oil discharge mechanism (40) only in the compressor (2b) located on the most downstream side of the differential pressure control mechanism (4a) through which lubricating oil flows.

A measure taken in the invention according to claim 7 is so composed that in the invention of claim 1 or 2, an oil separator (43) is disposed on the discharge side of the compression mechanism (21).

A measure taken in the invention according to claim 8 is so composed that in the invention of claim 1 or 4, the compression mechanism (21) having the plural compressors (2a, 2b, ...) includes an oil separator (43) provided at a confluence of the discharge sides of the compressors (2a, 2b, ...) and an oil backing pipe (44) connected at an end thereof to the oil separator (43) and connected at the other end thereof upstream from a branch point of the suction sides of the compressors (2a, 2b, ...).

A measure taken in the invention according to claim 9 is so composed that in the invention of claim 1 or 4, the compression mechanism (21) having the plural compressors (2a, 2b, ...) includes oil separators (43) provided on the discharge sides of the compressors (2a, 2b, ...) respectively, and oil backing pipes (44) each connected at an end thereof to corresponding one of the oil separators (43) and each connected at the other end thereof upstream from a branch point of the suction sides of the compressors (2a, 2b, ...).

A measure taken in the invention according to claim 10 is so composed that in the invention of claim 1 or 4, the compression mechanism (21) having the plural compressors (2a, 2b, ...) includes oil separators provided on the discharge sides of the compressors (2a, 2b, ...) respectively, and oil backing pipes (44) each connected at an end thereof to the oil separator (43) of the corresponding compressor (2a, 2b, . . . ) and each connected at the other end thereof to the suction side of the other compressor (2a, 2b, . . . ).

A measure taken in the invention according to claim 11 is so composed that in the invention of claim 2, there is provided oil equalization mechanisms (9A, 9B, . . . ) for conducting surplus lubricating oil discharged from the oil discharge mechanism (40) of the compression mechanism (21) of each thermal source unit (2A, 2B, . . . ) to the suction side of the compression mechanism (21) of the other thermal source unit (2A, 2B, . . . ).

Operations

Under the above structure, in the invention according to claim 1, when lubricating oil stored in each compressor (2a, 2b, . . . ) exceeds a set amount in cooling operation or in heating operation, the excess of the lubricating oil is discharged from the compressor (2a, 2b, . . . ) by the oil discharge mechanism (40) and then the discharged lubricating oil is returned to the compressors (2a, 2b, . . . ).

As a result, an amount of lubricating oil is balanced among all the compressors (2a, 2b, . . . ).

In the invention according to claim 2, the compression mechanism (21) of each thermal source unit (2A, 2B, . . . ) is provided with an oil discharge mechanism (40). Accordingly, when lubricating oil stored in the compression mechanism (21) of each thermal source unit (2A, 2B, . . . ) exceeds a set amount, the excess of lubricating oil is discharged from the compression mechanism (21) by the oil discharge mechanism (40) and then the discharged lubricating oil is returned to the compression mechanisms (21) of the thermal source units (2A, 2B, . . . ).

Particularly, in the invention according to claim 3, since a single compressor (2a) is provided in every thermal source unit (2A, 2B, . . . ), an amount of lubricating oil is balanced among all the compressors (2a) of the thermal source units (2A, 2B, . . . ).

In the invention according to claim 4, a plurality of compressors (2a, 2b, . . . ) are provided in the thermal source unit (2A, 2B, . . . ), so that an amount of lubricating oil is balanced among all the thermal source units (2A, 2B, . . . ) and an amount of lubricating oil is balanced among all the compressors (2a, 2b, . . . ) in each thermal source unit (2A, 2B, . . . ).

In the invention according to claim 5, among the plural compressors (2a, 2b, . . . ) of each thermal source unit (2A, 2B, . . . ), lubricating oil flows into the low-pressure compressor (2b) through the oil equalizing pipe (45) owing to the differential pressure control mechanism (4a) so that an amount of lubricating oil is held equalized among all the compressors (2a, 2b, . . . ). Further, in the invention according to claim 6, lubricating oil is discharged by the oil discharge mechanism (40) located on the downstream side of lubricating oil so that an amount of lubricating oil is balanced among all the thermal source units (2A, 2B, . . . ).

In the invention according to claim 7, since an oil separator (43) is disposed on the discharge side of the compressor (2a, 2b, . . . ) so as to collect lubricating oil, oil equalization can be readily performed in the compression mechanism (21) or among the compression mechanisms (21).

Particularly, in the invention according to claim 8, lubricating oil discharged from the compressors (2a, 2b, . . . ) of the respective thermal source units (2A, 2B, . . . ) is collected by a single oil separator (43). In the inventions according to claims 9 and 10, lubricating oil is collected by the respective oil separators (43) in every compressor (2a, 2b, . . . ) and then the collected lubricating oil is returned to the compressors (2a, 2b, . . . ). Particularly, in the invention according to claim 10, the lubricating oil is returned to the compressor (2a, 2b, . . . ) different from the compressor (2a, 2b, . . . ) from which the lubricating oil is discharged. Accordingly, in these inventions, an amount of lubricating oil is securely balanced among all the compressors (2a, 2b, . . . ) in each thermal source unit (2A, 2B, . . . ).

In the invention according to claim 11, since oil equalization mechanisms (9A, 9B, . . . ) are disposed among the compression mechanisms (21) of the thermal source units (2A, 2B, . . . ), lubricating oil discharged from one compression mechanism (21) is positively conducted to the suction side of the compression mechanism (21) of the other thermal source unit (2A, 2B, . . . ), so that an amount of lubricating oil is securely balanced among all the thermal source units (2A, 2B, . . . ).

Effects

According to the invention of claim 1, when lubricating oil stored in the respective compressors (2a, 2b, . . . ) exceeds a set amount, the lubricating oil is discharged so that an amount of lubricating oil can be balanced among all the compressors (2a, 2b, . . . ). Accordingly, lack in lubricating oil can be securely prevented. Further, since it is not required to positively charge pressure loss as in the conventional manner, decrease in COP can be prevented.

Furthermore, since oil equalization can be performed among the compressors (2a, 2b, . . . ) regardless of piping at the site of installation, lack in lubricating oil can be securely prevented so that normal temperature control operation can be continued.

According to the inventions of claim 2 and claim 3, when lubricating oil stored in the respective compression mechanisms (21) exceeds a set amount in the plural thermal source units (2A, 2B, . . . ), the lubricating oil is discharged so that an amount of lubricating oil can be balanced among all the thermal source units (2A, 2B, . . . ). Accordingly, lack in lubricating oil can be securely prevented. Further, since it is not necessary to positively charge pressure loss among the compression mechanisms (21) of the thermal source units (2A, 2B, . . . ), decrease in COP can be prevented.

Further, since oil equalization can be performed among the compression mechanisms (21, 21, . . . ) regardless of piping at the site of installation, lack in lubricating oil can be securely prevented so that normal temperature control operation can be continued.

According to the invention of claim 4, an amount of lubricating oil can be balanced among the plural thermal source units (2A, 2B, . . . ) as well as an amount of lubricating oil can be balanced among all the compressors (2a, 2b, . . . ) in each thermal source unit (2A, 2B, . . . ). Accordingly, lack in lubricating oil can be securely prevented.

According to the invention of claim 5, there can be performed, by the differential pressure control mechanism (4a), oil equalization among the plural compressors (2a, 2b, . . . ) in each thermal source unit (2A, 2B, . . . ), so that an amount of lubricating oil can be securely balanced among all the thermal source units (2A, 2B, . . . ).

According to the invention of claim 6, since only the compressor (2b) located on the downstream side of lubricating oil is provided with the oil discharge mechanism (40), the compressor (2a) located on the upstream side can dispense with the oil discharge mechanism (40), thereby reducing the number of elements and simplifying the structure.

According to the inventions of claims 7, 8 and 9, since surplus lubricating oil is stored in the oil separator (43) outside the compression mechanism (21), it is essential only that the compressors (2a, 2b, ...) can store only a minimum amount of lubricating oil to be needed. Accordingly, size reduction of the compressors (2a, 2b, ...) can be accomplished.

According to the inventions of claims 8 and 9, since the oil separator (43) is disposed on the discharge side of the compression mechanism (21) and lubricating oil is returned therefrom to the compression mechanism (21), oil equalization can be performed among the compressors (2a, 2b, ...) without circulating lubricating oil over a refrigerant system so that an amount of lubricating oil can be further securely balanced among all the compressors (2a, 2b, ...). Particularly, according to the invention of claim 10, since lubricating oil collected by the oil separator (43) of one compressor (2a, 2b, ...) is returned to the other compressor (2a, 2b, ...), an amount of lubricating oil can be securely balanced among all the compressors (2a, 2b, ...).

Further, since lubricating oil is stored in the oil separator (43) of high pressure while surplus lubricating oil is delivered to the suction side of the compression mechanism (21), high-pressure lubricating oil can be fed to the required place so that oil equalization can be securely performed.

According to the invention of claim 11, since the oil equalization mechanisms (9A, 9B, ...) are disposed among the thermal source units (2A, 2B, ...), there can be securely prevented oil collection phenomena that lubricating oil collects to one thermal source unit (2A, 2B, ...). As a result, lack in lubricating oil can be securely prevented so that secure normal temperature control operation can be continued.

[BEST MODE FOR CARRYING OUT THE INVENTION]

Description is made below about embodiments of this invention with reference to the drawings.

<Embodiment 1>

Figure 1:
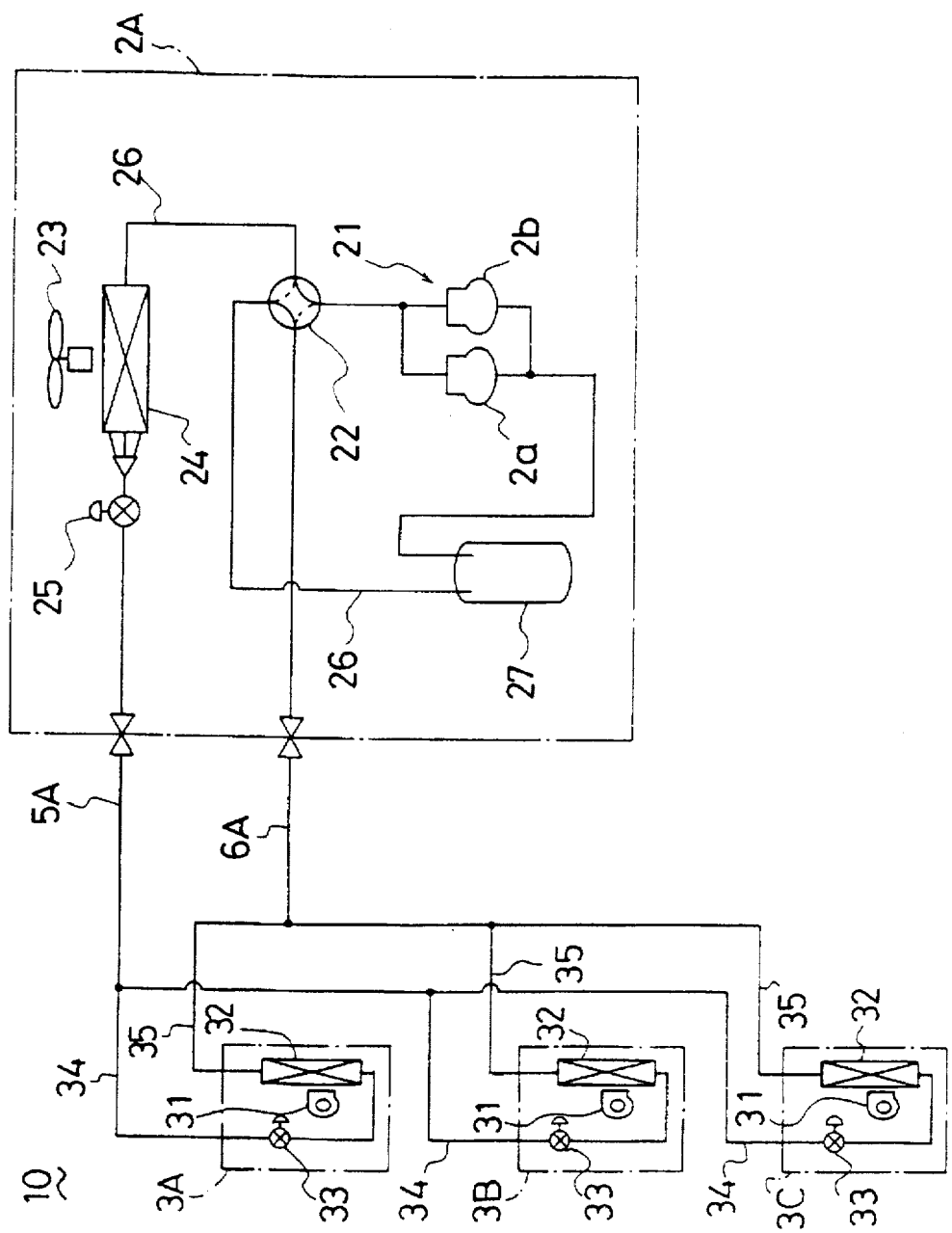
FIG. 1 is a refrigerant circuit diagram showing Embodiment 1 of this invention.

As shown in FIG. 1, an air conditioner (10) as a refrigerating apparatus is so composed that three indoor units (3A, 3B, 3C) are connected in parallel to a single outdoor unit (2A).

The outdoor unit (2A) has a compression mechanism (21), a four-way selector valve (22), an outdoor heat exchanger (24) as a thermal-source-side heat exchanger in the vicinity of which an outdoor fan (23) is disposed and an outdoor motor-operated expansion valve (25) as an expansion mechanism, and forms a thermal source unit reversibly operable between a cooling cycle and a heating cycle. The outdoor heat exchanger (24) is connected at a gas refrigerant side end thereof to a refrigerant piping section (26) and is connected at the other end of liquid refrigerant side to a liquid line (5A).

The refrigerant piping section (26) is connected to the suction side and discharge side of the compression mechanism (21) so as to be switchable therebetween by the four-way selector valve (22). Further, a gas line (6A) is connected, through the refrigerant piping section (26), to the suction side and discharge side of the compression mechanism (21) so as to be switchable therebetween by the four-way selector valve (22). An accumulator (27) is provided in the refrigerant piping section (26), between the suction side of the compression mechanism (21) and the four-way selector valve (22).

Each of the indoor unit (3A, 3B, 3C) has an indoor heat exchanger (32) as a used-side heat exchanger in the vicinity of which an indoor fan (31) is disposed and an indoor motor-operated expansion valve (33) and forms a user unit. The indoor heat exchangers (32) are connected in parallel to the liquid line (5A) and the gas line (6A) through an indoor liquid duct (34) and an indoor gas duct (35), respectively. The indoor motor-operated expansion valve (33) is provided in the indoor liquid duct (34).

Figure 2:
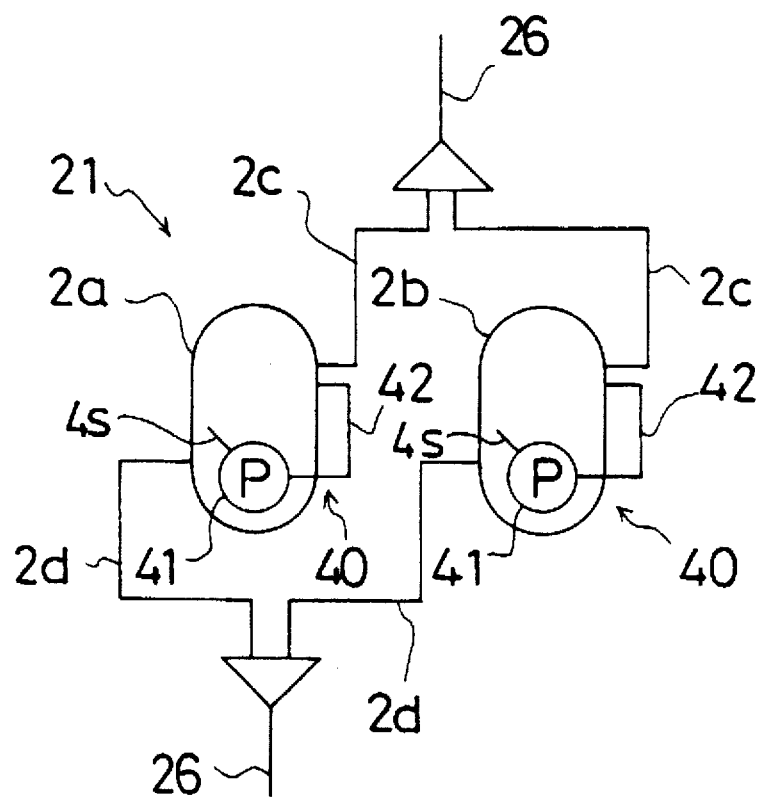
FIG. 2 is an enlarged circuit diagram of a compression mechanism.

As one of features of this invention, as shown in FIG. 2, the compression mechanism (21) is so composed that a first compressor (2a) and a second compressor (2b) are connected in parallel with each other. That is, whereas discharge pipes (2c) of both the compressors (2a, 2b) are confluent and are then connected to the refrigerant piping section (26), suction pipes (26) thereof are branched from the refrigerant piping section (26).

Further, each of the compressors (2a, 2b) is provided with an oil discharge mechanism (40). The oil discharge mechanism (40) is so composed as to discharge, when lubricating oil stored in a casing exceeds a set amount, the lubricating oil.

Figure 3:
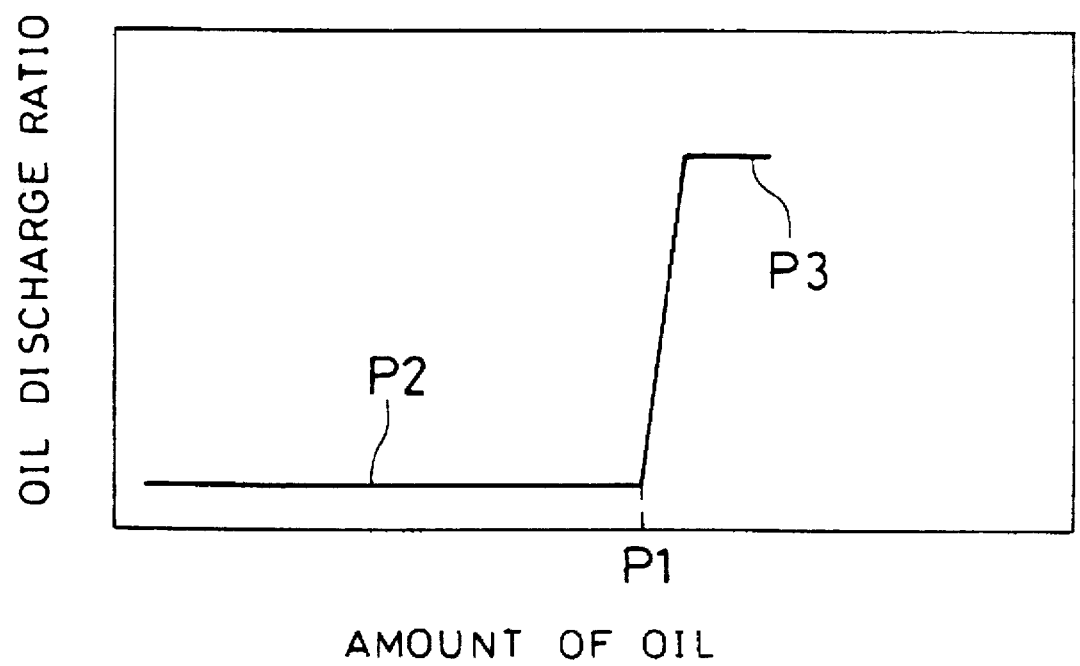
FIG. 3 is a graph showing characteristics of an oil discharge ratio with respect to an amount of storage of lubricating oil.

In detail, the compressor (2a, 2b) is a scroll compressor of low-pressure dome type, in which lubricating oil is accumulated at the bottom inside the casing. The oil discharge mechanism (40) has a discharge pump (41) disposed at the bottom inside the compressor (2a, 2b). A suction port (4s) of the discharge pump (41) is set to a specified position. As shown in FIG. 3, the oil discharge mechanism (40) is so composed that when lubricating oil stored in the casing accumulates up to the level of the suction port (4s) to reach a set amount (See a point P1), the lubricating oil is conducted from the discharge pump (41) to a suction port of the scroll through a discharge pipe (42) so that a discharge amount of lubricating oil is abruptly increased.

That is, a certain amount of lubricating oil is discharged together with discharged refrigerant at a point P2 of FIG. 3 and a discharge amount of lubricating oil is abruptly increased at the point P1. Then, at a point P3, a certain amount of lubricating oil is discharged in accordance with the volume of the discharge pump (41).

By the oil discharge mechanism (40), surplus lubricating oil that exceeds the set amount is increased in pressure by the scroll so as to be discharged to the refrigerant system.

Operations of Embodiment 1

Next, description is made about operations of the above air conditioner (10).

First, in cooling operation, the four-way selector valve (22) is switched as shown in the solid line of FIG. 1, and then high-pressure gas refrigerant discharged from the respective compressors (2a, 2b) of the outdoor unit (2A) is condensed by the outdoor heat exchanger (24) to turn liquid refrigerant. The liquid refrigerant is reduced in pressure by the indoor motor-operated expansion valve (33) and is then evaporated by the indoor heat exchanger (32) to turn low-pressure gas refrigerant. The gas refrigerant is returned to the respective compressors (2a, 2b) of the outdoor unit (2A) through the gas line (6A). This circulation is repeated.

On the other hand, in heating operation, the four-way selector valve (22) is switched as shown in the broken line of FIG. 1, and then high-pressure gas refrigerant discharged from the respective compressors (2a, 2b) of the outdoor unit (2A) is condensed by the indoor heat exchanger (32) to turn liquid refrigerant. The liquid refrigerant flows through the liquid line (5A), is reduced in pressure by the outdoor motor-operated expansion valve (25) of the outdoor unit (2A) and is then evaporated by the outdoor heat exchanger (24) to turn low-pressure gas refrigerant. The gas refrigerant is returned to the respective compressors (2a, 2b) of the outdoor unit (2A). This circulation is repeated.

In the above cooling operation and heating operation, each of the compressors (2a, 2b) stores lubricating oil in the casing thereof. The lubricating oil is discharged together with refrigerant and is then returned to the compressors (2a, 2b) through the indoor units (3A, 3B, 3C). The lubricating oil may be returned unevenly to the respective compressors (2a, 2b), that is, oil collecting phenomena that lubricating oil is collected to one of the compressors (2a, 2b) may occur.

In this case, when lubricating oil of more than a set amount is stored in the compressor (2a, 2b), the excess of lubricating oil is discharged by the oil discharge mechanism (40). Thereafter, the surplus lubricating oil is increased in pressure by the scroll of the compressor (2a, 2b) and is then returned to the compressors (2a, 2b) through the indoor units (3A, 3B, 3C).

As a result, in the case that an approximately same amount of lubricating oil is returned to the respective compressors (2a, 2b), the compressor (2a, 2b) storing a large amount of lubricating oil discharges a large amount of lubricating oil by the oil discharge mechanism (40) so that a small amount of lubricating oil is returned to the compressor (2a, 2b). Accordingly, lubricating oil is balanced between both the compressors (2a, 2b).

Effects of Oil Discharge Mechanism (40) of Embodiment 1

As described above, according to the present embodiment, when lubricating oil stored in the respective compressors (2a, 2b) exceeds a set amount, the lubricating oil is discharged so that an amount of lubricating oil can be balanced between the compressors (2a, 2b). Accordingly, lack in lubricating oil can be securely prevented. Further, since it is not necessary to positively charge pressure loss as in the conventional manner, decrease in COP can be prevented.

Furthermore, since oil equalization can be preformed between the compressors (2a, 2b) regardless of piping at the site of installation, lack in lubricating oil can be securely prevented so that normal temperature control operation can be continued.

Modification 1 of Embodiment 1

Figure 4:
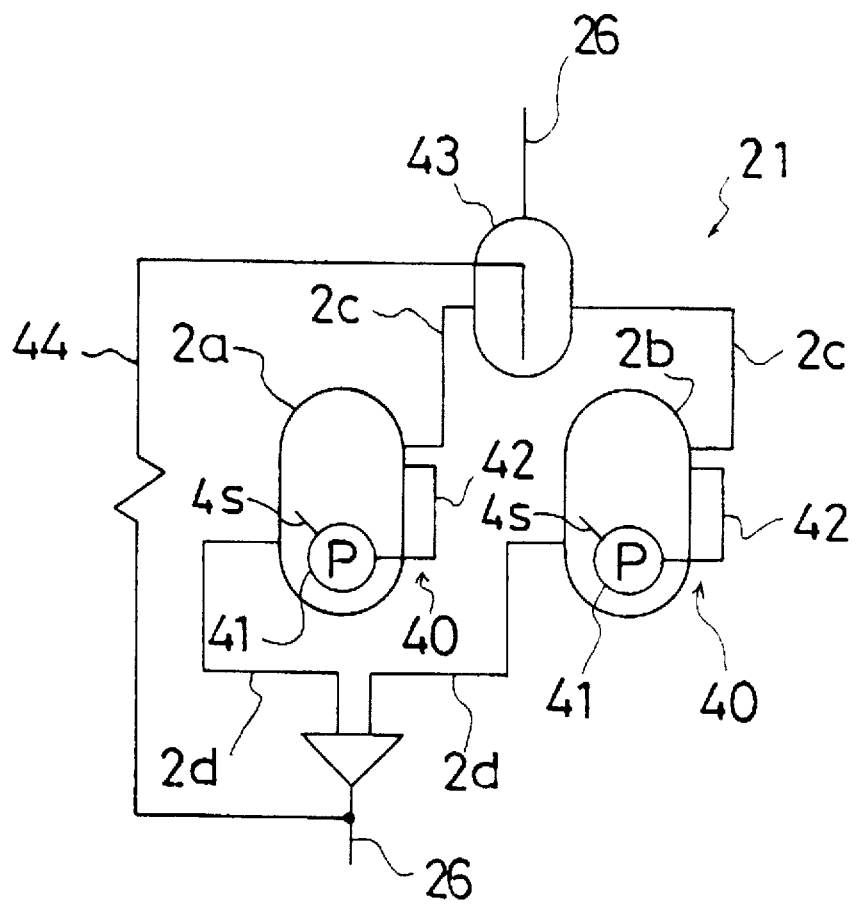
FIG. 4 is an enlarged circuit diagram showing Modification 1 of the compression mechanism.

FIG. 4 shows a modification of the compression mechanism (21), in which an oil separator (43) is disposed on the discharge sides of the compressors (2a, 2b).

In detail, the discharge pipes (2c) of the compressors (2a, 2b) are each connected to the oil separator (43). The oil separator (43) is for separating refrigerant and lubricating oil discharged together from the compressors (2a, 2b) and is connected to the refrigerant piping section (26). An oil backing pipe (44) having a capillary is connected at an end thereof to the oil separator (43) and is connected at the other end thereof to the refrigerant piping section (26) before the refrigerant piping section (26) is branched into the suction pipes (2d) of the compressors (2a, 2b).

Accordingly, lubricating oil discharged from the respective compressors (2a, 2b) is returned to the suction sides of the compressors (2a, 2b) through the oil separator (43). As a result, since lubricating oil does not circulate among the indoor units (3A, 3B, 3C), oil equalization can be securely performed between both the compressors (2a, 2b).

Further, since surplus lubricating oil is stored in the oil separator (43) located outside the compressors (2a, 2b), it is essential only that each compressor (2a, 2b) can store a minimum amount of lubricating oil to be needed, thereby accomplishing the size reduction of the compressors (2a, 2b).

Furthermore, since lubricating oil is stored in the oil separator (43) of high pressure and surplus lubricating oil is delivered to the suction sides of the compressors (2a, 2b), high-pressure lubricating oil can be fed to the required place thereby accomplishing secure oil equalization.

Modification 2 of Embodiment 1

Figure 5:
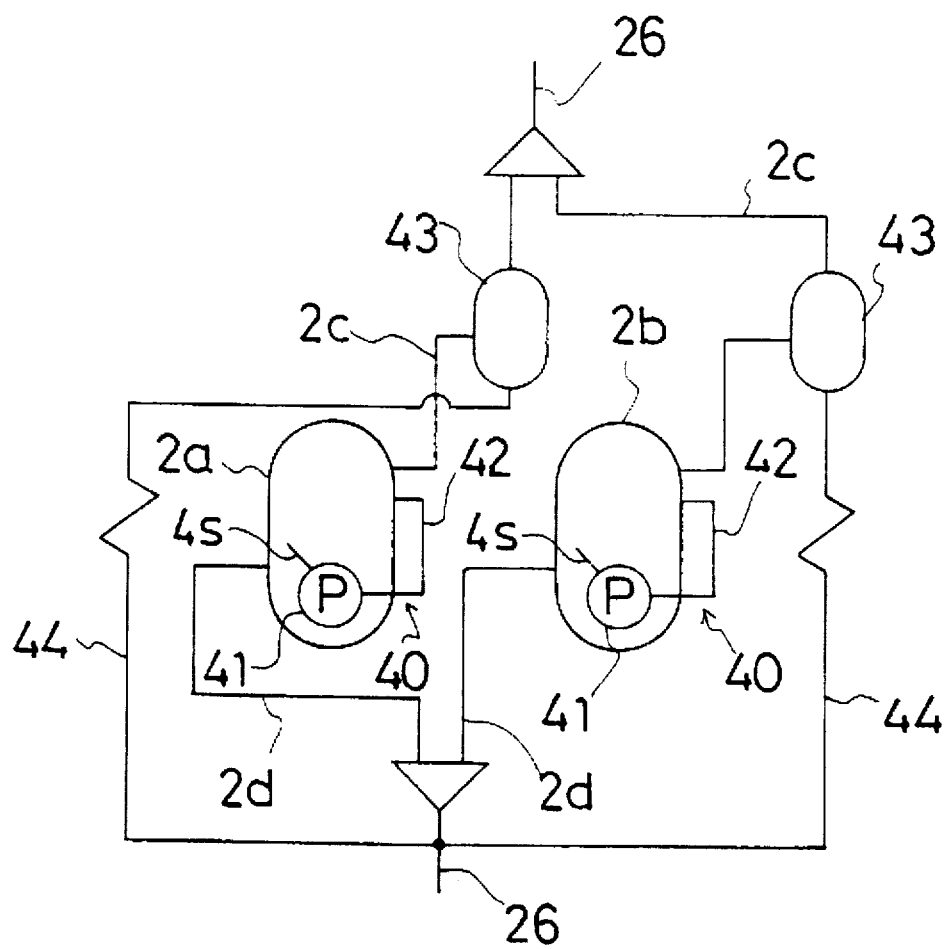
FIG. 5 is an enlarged circuit diagram showing Modification 2 of the compression mechanism.

FIG. 5 shows another modification of the compression mechanism (21), in which oil separators (43) are disposed in the discharge pipes (2c) of the compressors (2a, 2b), respectively.

In detail, each of the discharge pipes (2c) of the compressors (2a, 2b) is connected, downstream from the oil separator (43), to the refrigerant piping section (26). The oil separators (43) are for separating refrigerant and lubricating oil discharged together from the compressor (2a, 2b) and are connected to respective oil backing pipes (44). The oil backing pipes (44) each have a capillary and are each connected to the refrigerant piping section (26) before the refrigerant piping section (26) is branched into the suction pipes (2d) of the compressors (2a, 2b).

Accordingly, lubricating oil discharged from the respective compressors (2a, 2b) is returned to the suction sides of the compressors (2a, 2b) through the respective oil separators (48). As a result, since lubricating oil does not circulate among the indoor units (3A, 3B, 3C), oil equalization can be securely performed between both the compressors (2a, 2b) and the size reduction of the compressors (2a, 2b) can be accomplished.

Modification 3 of Embodiment 1

Figure 6:
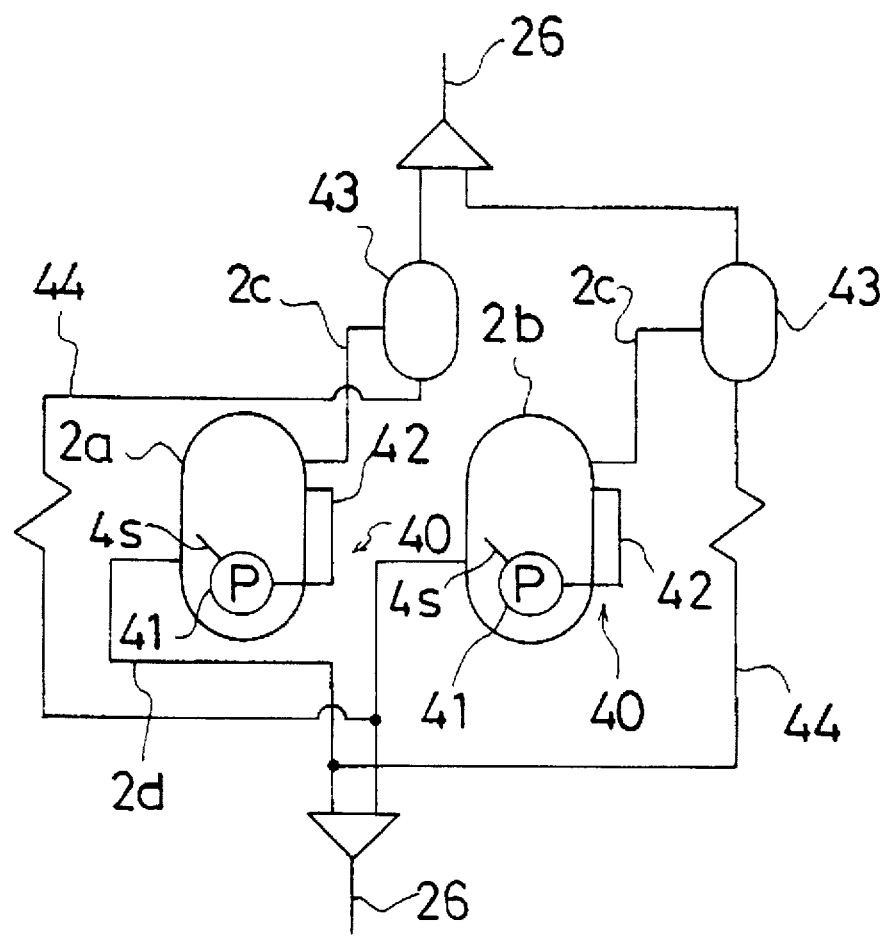
FIG. 6 is an enlarged circuit diagram showing Modification 3 of the compression mechanism.

FIG. 6 shows another modification of the compression mechanism (21), in which, similar to Modification 2, oil separators (43) are disposed in the discharge pipes (2c) of the compressors (2a, 2b), respectively.

In detail, each of the discharge pipes (2c) of the compressors (2a, 2b) is connected, downstream from the oil separator (43), to the refrigerant piping section (26). Respective oil backing pipes (44) each having a capillary are connected to the respective oil separators (43). The oil backing pipe (44) connected at an end thereof to the oil separator (48) of one compressor (2a, 2b) is connected at the other end thereof to the suction pipe (2d) of the other compressor (2a, 2b).

More specifically, the oil backing pipe (44) of the first compressor (2a) is connected to the suction pipe (2d) of the second compressor (2b) while the oil backing pipe (44) of the second compressor (2b) is connected to the suction pipe (2d) of the first compressor (2a).

Accordingly, lubricating oil discharged from one compressor (2a, 2b) is returned to the suction side of the other compressor (2a, 2b) through the oil separator (43). As a result, since lubricating oil can be securely delivered from the compressor (2a, 2b) having a larger amount of lubricating oil to the compressor (2a, 2b) having a smaller amount of lubricating oil, oil equalization can be securely performed between both the compressors (2a, 2b) and the size reduction of the compressors (2a, 2b) can be accomplished.

<Embodiment 2>

Figure 7:
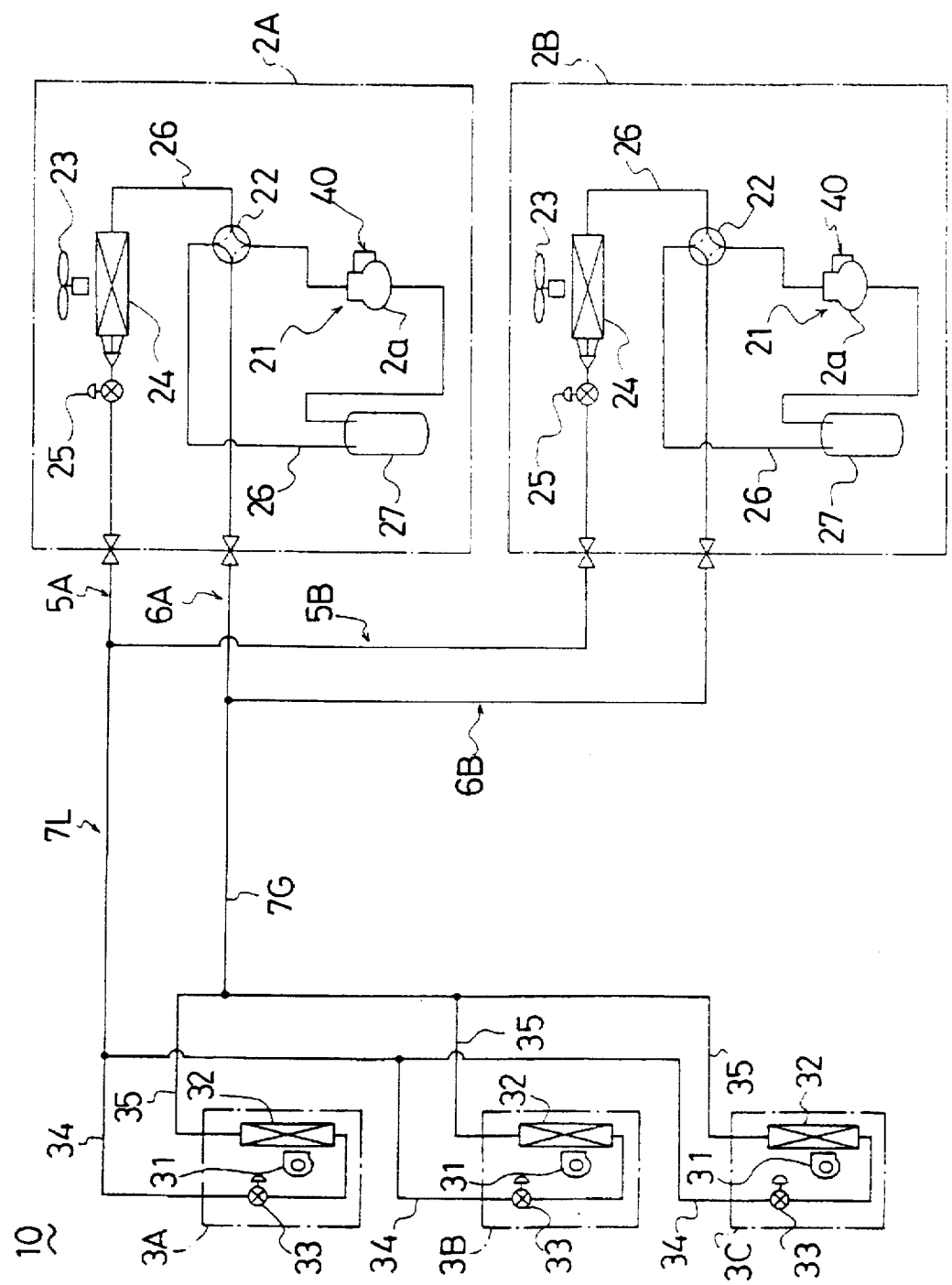
FIG. 7 is a refrigerant circuit diagram showing Embodiment 2.

In the present embodiment, as shown in FIG. 7, a first outdoor unit (2A) and a second outdoor unit (2B) are arranged in parallel with each other.

In each outdoor unit (2A, 2B), a liquid line (5A, 5B) and a gas line (6A, 6B) are connected to a main liquid line (7L) and a main gas line (7G), respectively. Three indoor units (3A, 3B, 3C) are connected in parallel to the main liquid line (7L) and the main gas line (7G).

Further, while each of the outdoor units (2A, 2B) is composed as in Embodiment 1, each compression mechanism (21) is composed of a single compressor (2a) and the compressor (2a) is provided with an oil discharge mechanism (40) as in Embodiment 1.

In the present embodiment, in cooling operation, high-pressure refrigerant discharged from the respective compressors (2a) of the outdoor units (2A, 2B) is condensed, is confluent at the main liquid line (7L), is circulated among the indoor units (3A, 3B, 3C), is diverted into the respective gas lines (6A, 6B) and is then returned to the compressors (2a) of the outdoor units (2A, 2B).

On the other hand, in heating operation, high-pressure gas refrigerant discharged from the respective compressors (2a) of the outdoor units (2A, 2B) is confluent at the main gas line (7G), is circulated among the indoor units (3A, 3B, 3C), is diverted into the respective liquid lines (5A, 5B) and is then returned to the compressors (2a) of the outdoor units (2A, 2B).

When lubricating oil exceeds a set amount in any of the compressors (2a), the oil discharge mechanism (40) acts to discharge lubricating oil so that an amount of lubricating oil is balanced between the compressors (2a) in each outdoor unit (2A, 2B) as in Embodiment 1.

Accordingly, in the case that the outdoor unit (2A, 2B) is multiplied, lubricating oil of all the compressors (2a) can be kept at a proper amount with no conventional oil equalizing pipe.

<Embodiment 3>

Figure 8:
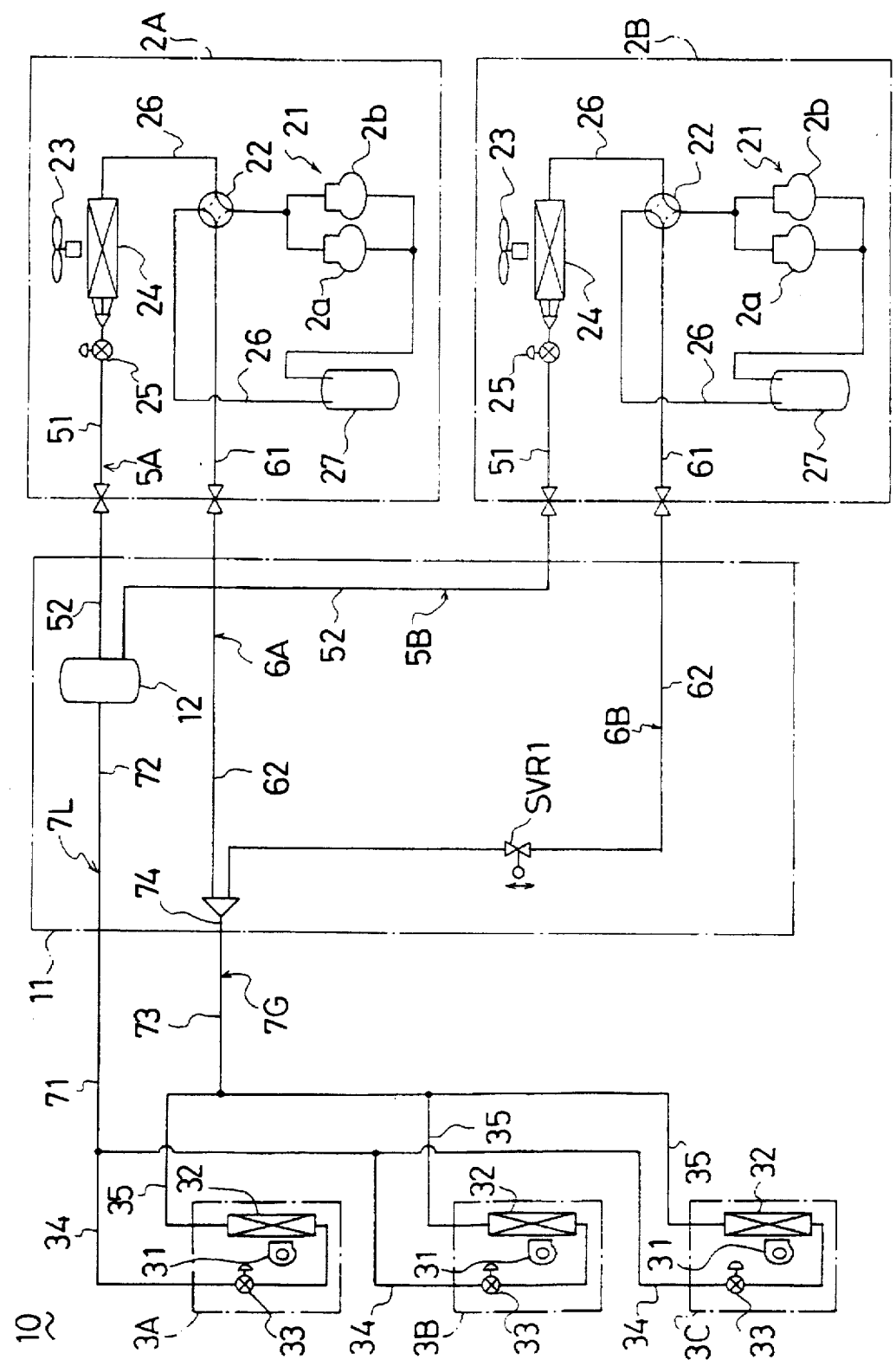
FIG. 8 is a refrigerant circuit diagram showing Embodiment 3.

As shown in FIG. 8, the present embodiment is so composed that the first outdoor unit (2A) and the second outdoor unit (2B) of Embodiment 2 each have two compressors (2a, 2b) as in Embodiment 1.

Here, reference numeral (11) is a piping unit. In the piping unit (11), liquid lines (5A, 5B) of the outdoor units (2A, 2B) are connected to a main liquid line (7L) and gas lines (6A, 6B) of the outdoor units (2A, 2B) are connected to a main gas line (7G).

In detail, each of the liquid lines (5A, 5B) is composed of a liquid pipe (51) extending outside from the outdoor unit (2A, 2B) and a liquid passage (52) connecting to an outer end of the liquid pipe (51). The liquid pipe (51) is connected at an inner end thereof to an outdoor heat exchanger (24) and is provided with an outdoor motor-operated expansion valve (25). The liquid passage (52) is connected to the mail liquid line (7L) through a receiver (12).

Each of the gas lines (6A, 6B) is composed of a gas pipe (61) extending outside from the outdoor unit (2A, 2B) and a gas passage (62) connecting to an outer end of the gas pipe (61). The gas pipe (61) is connected to the compressors (2a, 2b) (21) through a four-way selector valve (22) and a refrigerant piping section (26).

The main liquid line (7L) is composed of a main liquid pipe (71) extending toward indoor units (3A, 3B, 3C) and a main liquid passage (72) which connects to an end of the main liquid pipe (71) and to which the liquid passages (52) of the outdoor units (2A, 2B) connect through the receiver (12). Respective indoor liquid ducts (34) of the indoor units (3A, 3B, 3C) are connected to the other end of the main liquid pipe (71).

The main gas line (7G) is composed of a main gas pipe (73) extending toward the indoor units (3A, 3B, 3C) and a main gas passage (74) which connects to an end of the main gas pipe (73) and to which the gas passages (62) of the outdoor units (2A, 2B) connect. Respective indoor gas ducts (35) of the indoor units (3A, 3B, 3C) are connected to the other end of the main gas pipe (73).

The liquid passages (52) of the liquid lines (5A, 5B) of the outdoor units (2A, 2B), the gas passages (62) of the gas lines (6A, 6B) of the outdoor units (2A, 2B), the main liquid passage (72) of the main liquid line (7L), the main gas passage (74) of the main gas line (7G) and the receiver (12) are integrally formed so that they are unitized into the piping unit (11).

Further, a gas stop valve (SVR1) is also integrally united in the piping unit (11). The gas stop valve (SVR1) is disposed in the gas passage (62) of the gas line (6B) of the second outdoor unit (2B) to open and close the gas passage (62), and is so composed as to fully close at the deactivation of the second outdoor unit (2B) in heating operation. The outdoor motor-operated expansion valve (25) of the second outdoor unit (2B) is so composed as to fully close at the deactivation of the second outdoor unit (2B) in cooling operation and heating operation.

Consequently, according to the present embodiment, since the oil discharge mechanism (40) as in Embodiment 1 of FIG. 2 is provided though it is not shown in FIG. 8, lubricating oil can be kept in a proper amount between both the compression mechanisms (21) of the outdoor units (2A, 2B) as well as lubricating oil can be kept in a proper amount between both the compressors (2a, 2b) in each outdoor unit (2A, 2B).

Modification 1 of Embodiment 3

Figure 9:
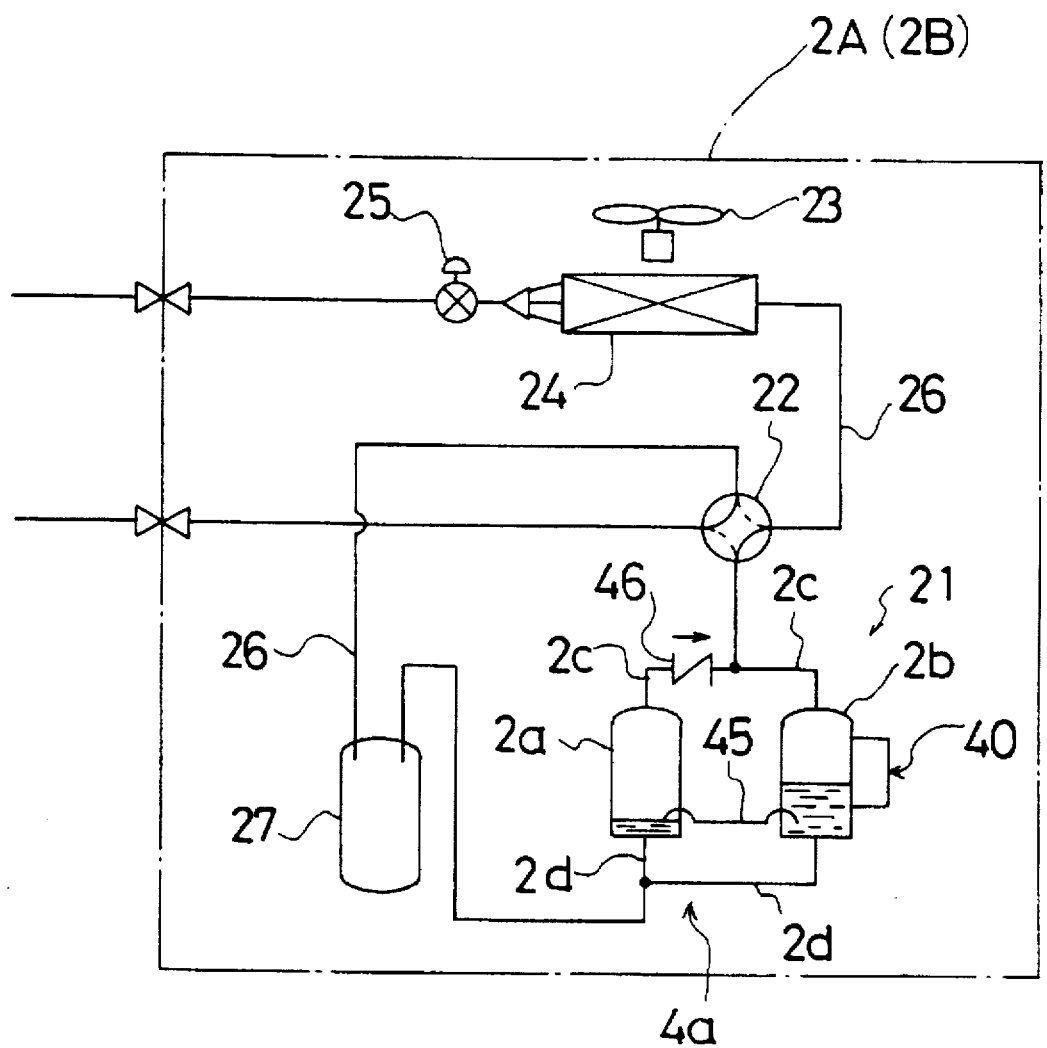
FIG. 9 is an enlarged circuit diagram showing Modification 1 of the compression mechanism of Embodiment 3.

FIG. 9 shows a modification of the compression mechanism (21), in which a differential pressure control mechanism (4a) is disposed between the compressors (2a, 2b) in each outdoor unit (2A, 2B).

In detail, a pressure loss of the suction pipe (2d) of the second compressor (2b) is set larger than that of the suction pipe (2d) of the first compressor (2a). An oil equalizing pipe (45) is disposed between both the compressors (2a, 2b). Thus, owing to the differential pressure control mechanism (4a), since the inner space of the second compressor (2b) becomes lower in pressure than that of the first compressor (2a) when both the compressors (2a, 2b) are operated, lubricating oil flows into the second compressor (2b) through the oil equalizing pipe (45) to accumulate therein. In other words, the second compressor (2b) becomes the downstream side of lubricating oil.

Further, the second compressor (2b) is set so as to operate prior to the first compressor (2a). The oil discharge mechanism (40) is disposed only in the second compressor (2b).

Reference numeral (46) is a non-return valve disposed in the discharge pipe (2c) of the first compressor (2a).

Accordingly, in the present embodiment, since lubricating oil is normally stored only in the second compressor (2b) of each outdoor unit (2A, 2B), the first compressor (2a) can dispense with the oil discharge mechanism (40).

Modification 2 of Embodiment 3

Figure 10:
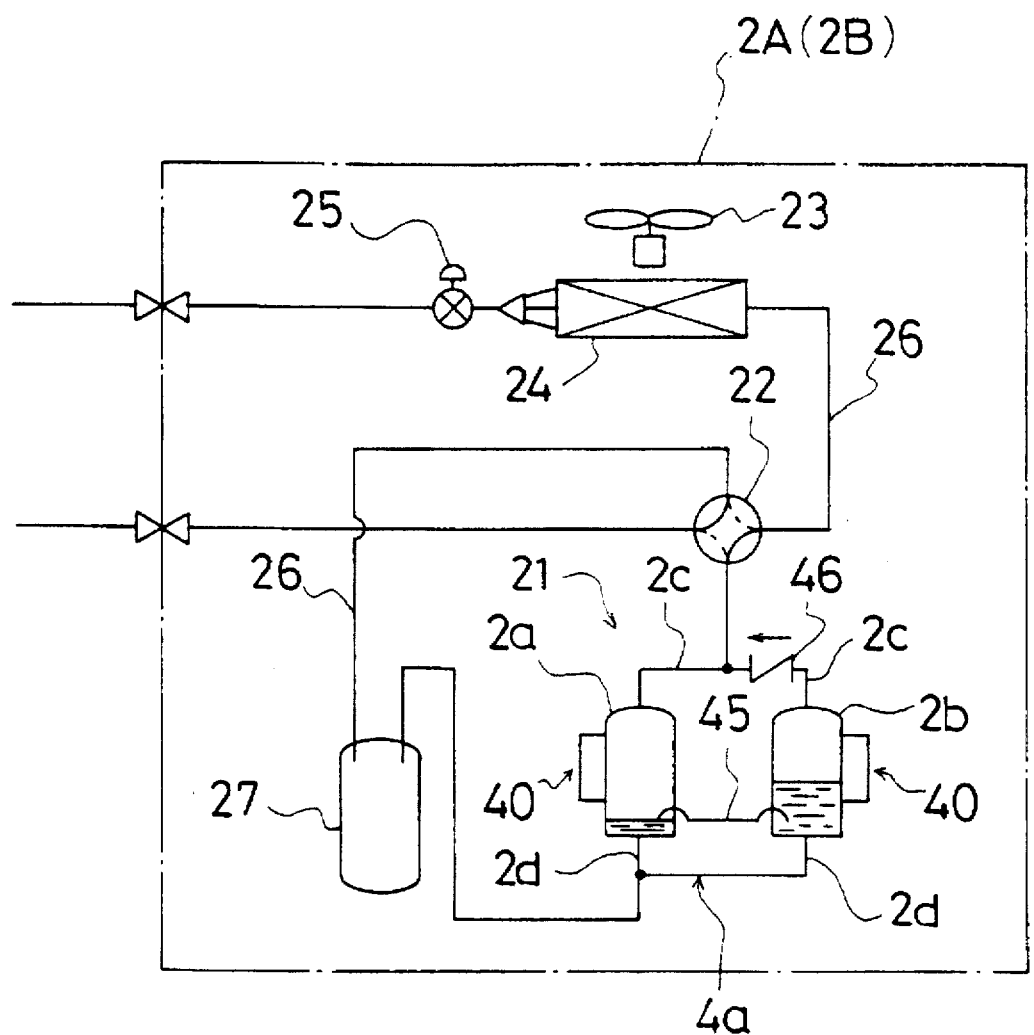
FIG. 10 is an enlarged circuit diagram showing Modification 2 of the compression mechanism of Embodiment 3.

FIG. 10 shows another modification of the compression mechanism (21), in which, unlike Modification 1, the first compressor (2a) is set so as to operate prior to the second compressor (2b) and the oil discharge mechanism (40) is disposed in each of the compressors (2a, 2b), respectively.

Reference numeral (46) is a non-return valve disposed in the discharge pipe (2c) of the first compressor (2a).

Accordingly, in the present embodiment, whereas lubricating oil is stored in the first compressor (2a) when the first compressor (2a) is operated, lubricating oil is stored in the second compressor (2b) when both the first compressor (2a) and second compressor (2b) are operated. Accordingly, when lubricating oil in each compressor (2a, 2b) exceeds a set amount, the corresponding oil discharge mechanism (40) acts to discharge lubricating oil so that lubricating oil can be kept in a proper amount.

Modification 3 of Embodiment 3

Figure 11:
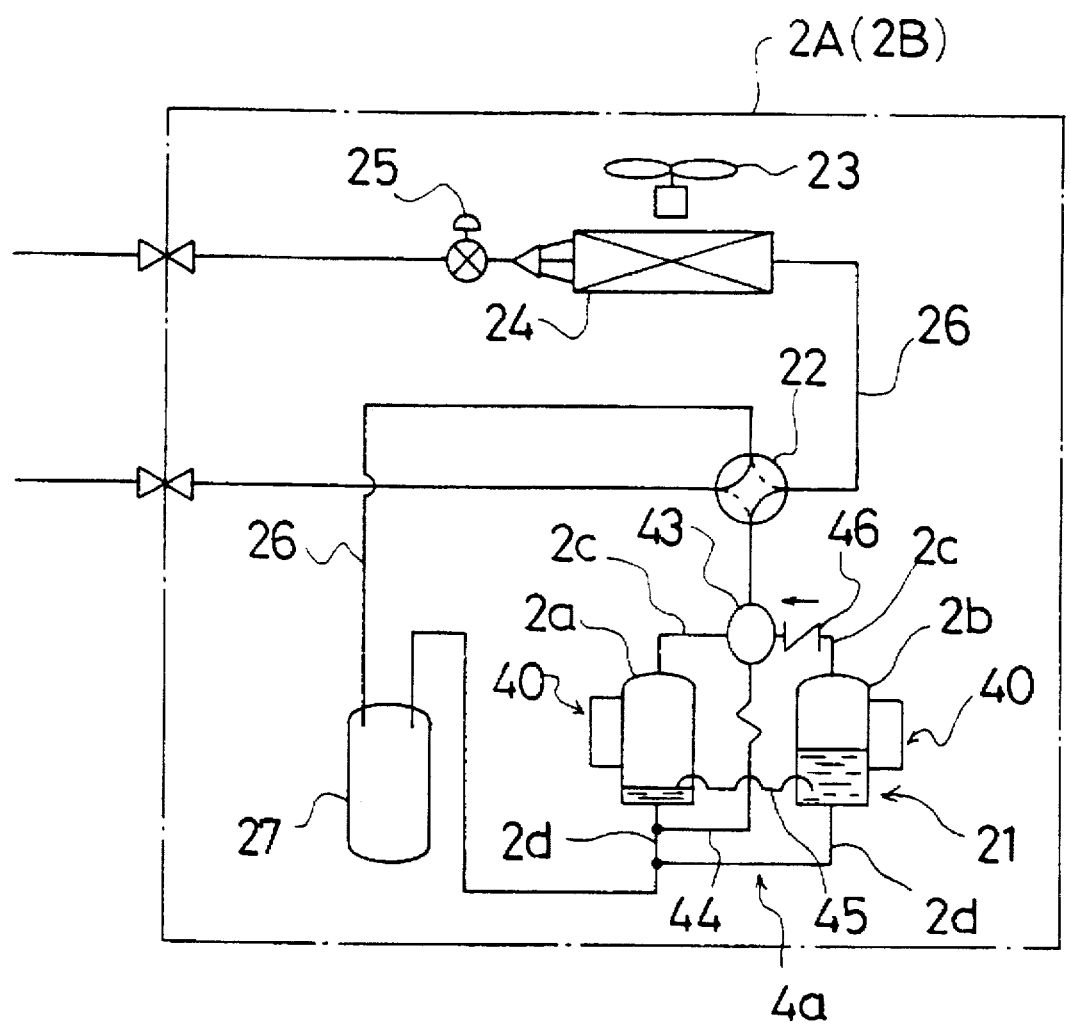
FIG. 11 is an enlarged circuit diagram showing Modification 3 of the compression mechanism of Embodiment 3.

FIG. 11 shows another modification of the compression mechanism (21), in which an oil separator (43) is disposed at a connecting part of both the discharge pipes (2c) of the compressors (2a, 2b) in addition to the structure of Modification 2 and an oil backing pipe (44) is connected to the suction pipe (2d) of the first compressor (2a).

In the present embodiment, since lubricating oil separated in the oil separator (43) is directly returned to the first compressor (2a) and is then delivered to the second compressor (2b), lubricating oil can be restrained from circulating among the indoor units (3A, 3B, 3C) so that lubricating oil in each outdoor unit (2A, 2B) can be securely kept in a proper amount.

Description is made below about a basic principle that the compression mechanism (21) of the present modification eliminates oil collecting phenomena, with reference to FIG. 12.

Figure 12:
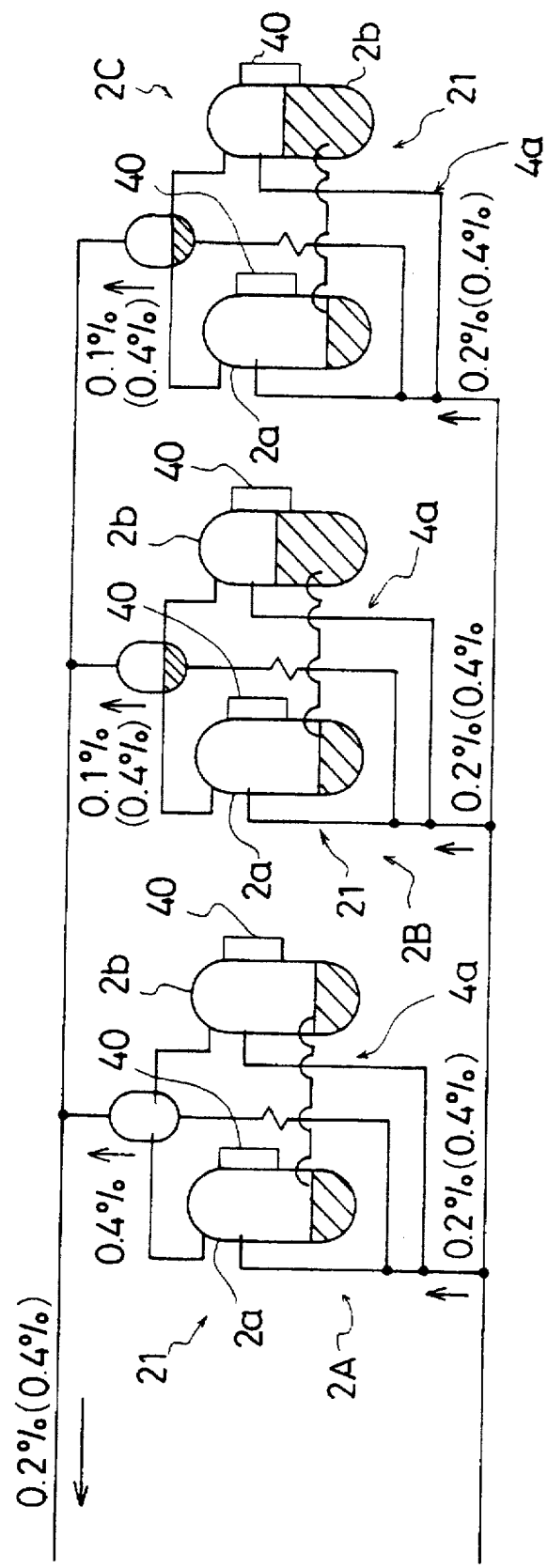
FIG. 12 is a schematic circuit diagram of an essential part, showing oil equalizing operation in Modification 3.

FIG. 12 shows a schematic diagram of the refrigerant circuit in which three outdoor units (2A, 2B, 2C) are provided. Supposing that an oil discharge ratio as a content of lubricating oil in the gas refrigerant discharged from the compression mechanism (21) of the first outdoor unit (2A) is 0.4%, respective oil discharge ratios in the gas refrigerant discharged from respective compression mechanisms (21) of the second and third outdoor units (2B, 2C) are 0.1%, and lubricating oil of 0.2% is returned to the compression mechanisms (21) of the outdoor units (2A, 2B, 2C), respectively. In this case, lubricating oil may be collectively stored in the second outdoor unit (2B) and third outdoor unit (2C).

At this time, in the second outdoor unit (2B) and third outdoor unit (2C), a large amount of lubricating oil is stored in the oil separators (43) owing to the oil discharge mechanisms (40). When lubricating oil is stored above the level of the discharge pipe (2c) of the compressor (2a, 2b) in each of the oil separators (43), the oil separator (43) cannot store lubricating oil above the level. Thus, lubricating oil is discharged outside from the second outdoor unit (2B) and the third outdoor unit (2C) so that the oil discharge ratios of the second outdoor unit (2A) and third outdoor unit (2C) become 0.4%.

As a result, all the oil discharge ratios of three outdoor units (2A, 2B, 2C) become 0.4% so that lubricating oil of 0.4% is returned to the compression mechanisms (21) of all the outdoor units (2A, 2B, 2C), respectively. Thus, an amount of lubricating oil of the first outdoor unit (2A) is increased so that the oil collecting phenomena can be eliminated.

The compression mechanism (21) of the present modification may be substituted by any one of the structures shown in FIGS. 4 to 6.

<Embodiment 4>

Figure 13:
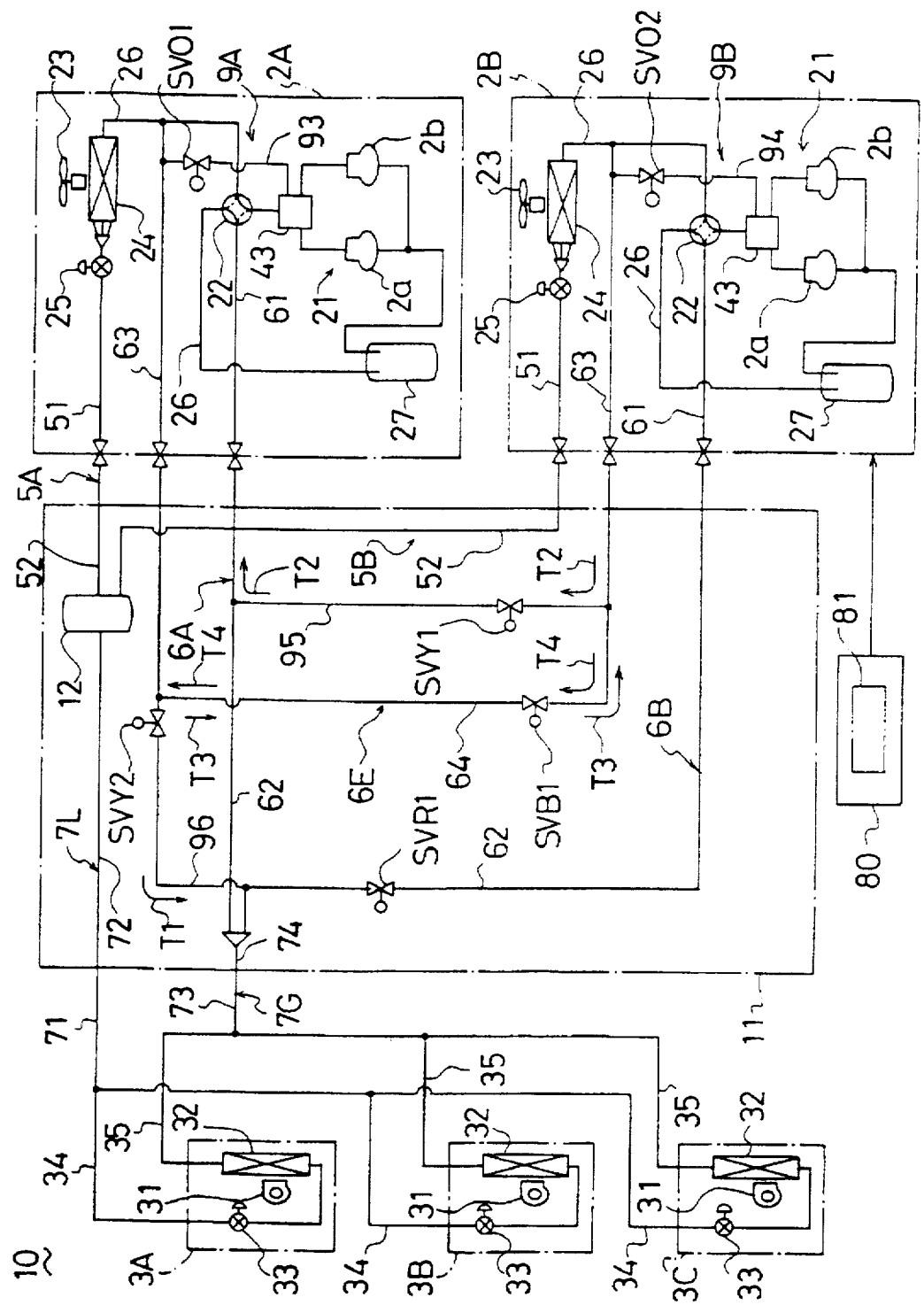
FIG. 13 is a refrigerant circuit diagram showing Embodiment 4.

As shown in FIG. 13, the present embodiment is so composed that oil equalization mechanisms (9A, 9B) are provided in Embodiment 3 of FIG. 8.

In the present embodiment, a pressure equalizing line (6E) is provided between the first outdoor unit (2A) and the second outdoor unit (2B).

The pressure equalizing line (6E) is connected at an end thereof to the gas refrigerant side of the refrigerant piping section (26) of the outdoor heat exchanger (24) of the first outdoor unit (2A) and is connected at the other end thereof to the gas refrigerant side of the refrigerant piping section (26) of the outdoor heat exchanger (24) of the second outdoor unit (2B), so as to allow dual-directional communication of refrigerant.

The pressure equalizing line (6E) is so composed that respective outer ends of pressure equalizing pipes (63) extending outside from the respective outdoor units (2A, 2B) are connected to a pressure equalizing passage (64). The pressure equalizing passage (64) is provided with a pressure equalizing valve (SVB1) which is fully closed at the deactivation of the second outdoor unit (2B) in cooling operation to block the entrance to the second outdoor unit (2B) of refrigerant.

The pressure equalizing passage (64) and the pressure equalizing valve (SVB1) are integrated into the piping unit (11) so as to be unitized.

As one of features of this invention, there are provided, between the first outdoor unit (2A) and second outdoor unit (2B), the first oil equalization mechanism (9A) for conducting lubricating oil discharged from the compression mechanism (21) of the first outdoor unit (2A) to the suction side of the compression mechanism (21) of the second outdoor unit (2B) and the second oil equalization mechanism (9B) for conducting lubricating oil discharged from the compression mechanism (21) of the second outdoor unit (2B) to the suction side of the compression mechanism (21) of the first outdoor unit (2A), and a controller (80) is provided with an oil equalizing control means (81).

Figure 14:
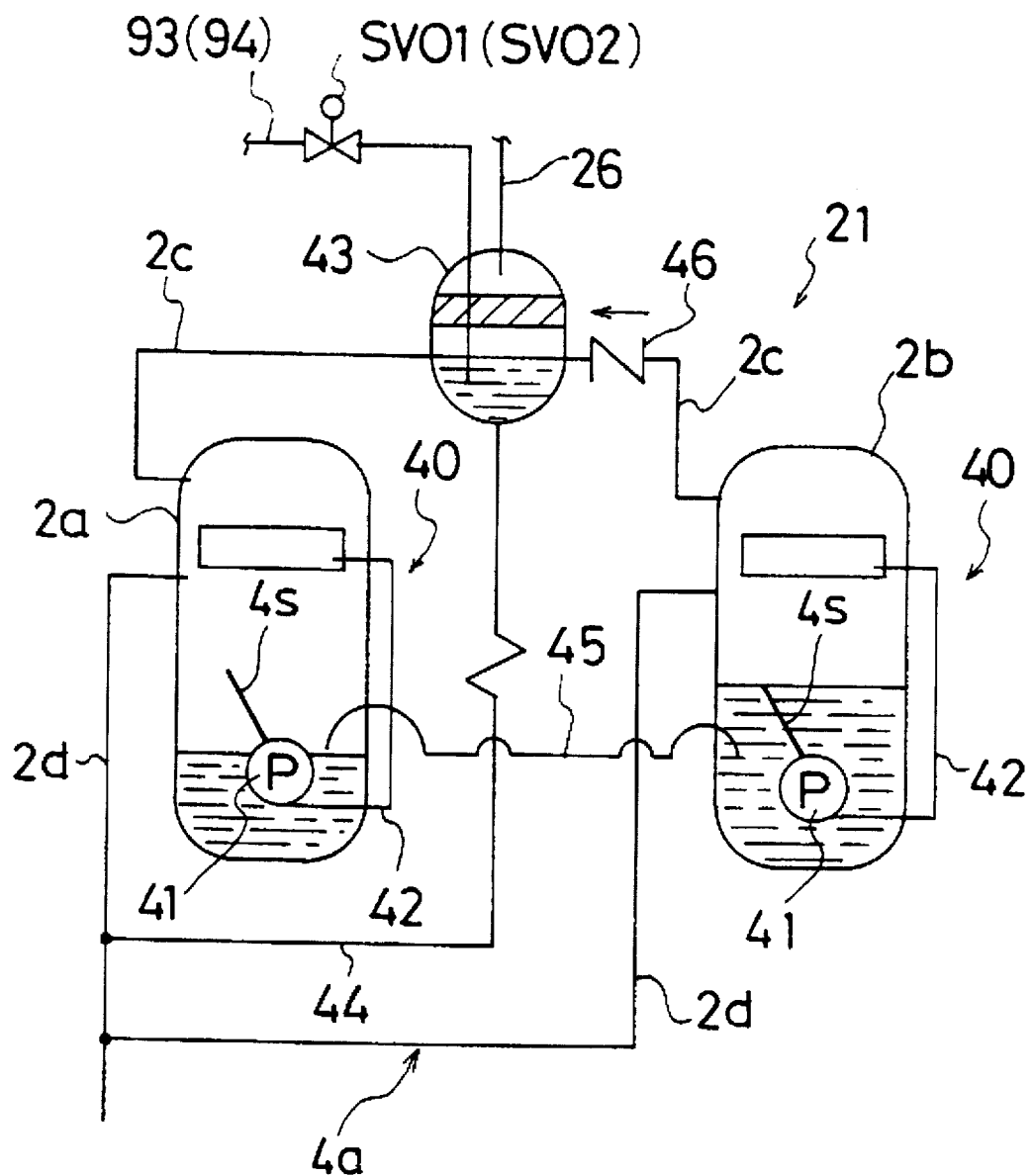
FIG. 14 is an enlarged circuit diagram showing a compression mechanism of Embodiment 4.

As shown in FIG. 14, the compression mechanism (21) has an oil discharge mechanism (40), an oil separator (43), an oil equalizing pipe (45) and the like, as in Modification 3 of Embodiment 3 shown in FIG. 11.

The first oil equalization mechanism (9A) and second oil equalization mechanism (9B) each have an oil equalizing bypass pipe (93, 94) and a gas bypass passage (95, 96). Each of the oil equalizing bypass pipes (93, 94) is connected at an end thereof to the oil separator (43) and is connected at the other end thereof to the pressure equalizing pipe (63) of the pressure equalizing line (6E). Each of the oil equalizing bypass pipes (93, 94) has an oil equalizing valve (SVO1, SVO2) so as to derive a surplus part out of lubricating oil stored in the oil separator (43).

In detail, as shown in FIG. 14, one end of each oil equalizing bypass pipe (93, 94) is introduced into the oil separator (43). The introduced end of the oil equalizing bypass pipe (93, 94) is located at the level higher by a set height than the bottom of the oil separator (43). Specifically, while a set amount out of lubricating oil stored in the oil separator (43) is returned to the compression mechanism (21) through the oil backing pipe (44), surplus lubricating oil accumulates in the oil separator (43). When an amount of storage of lubricating oil exceeds the set level in the oil separator (43) so that surplus lubricating oil accumulates, the surplus lubricating oil flows out through the oil equalizing bypass pipe (93, 94).

Both the gas bypass passages (95, 96) are integrated into the piping unit (11). The first gas bypass passage (95) is connected at an end thereof to the second outdoor unit (2B) side from the pressure equalizing valve (SVB1) of the pressure equalizing passage (64), is connected at the other end thereof to the gas passage (62) of the first outdoor unit (2A), and has a first bypass valve (SVY1).

The second gas bypass passage (96) is connected at an end thereof to the first outdoor unit (2A) side from the pressure equalizing valve (SVB1) of the pressure equalizing passage (64), is connected at the other end thereof to the gas passage (62) of the second outdoor unit (2B), and has a second bypass valve (SVY2).

Further, the oil equalizing control means (81) is so composed as to perform, in normal operation, 2 to 3 minutes oil equalizing operation once in every 2 to 3 hours and to perform oil equalizing operation after oil backing operation and after defrosting operation in heating operation. The oil equalizing control means (81) controls the respective gas bypass passages (95, 96) and the respective oil equalizing bypass pipes (93, 94) between their communication states and their shut-off states in order that lubricating oil flows alternately between the outdoor units (2A, 2B) in cooling operation. In detail, the oil equalizing control means (81) opens the first oil equalizing valve (SVO1) and the second bypass valve (SVY2) with closing the pressure equalizing valve (SVB1) to conduct lubricating oil from the first outdoor unit (2A) to the second outdoor unit (2B), and opens the second oil equalizing valve (SVO2) and the first bypass valve (SVY1) with closing the pressure equalizing valve (SVB1) to conduct lubricating oil from the second outdoor unit (2B) to the first outdoor unit (2A).

In addition, the oil equalizing control means (81) controls the respective oil equalizing bypass pipes (93, 94) between their communication states and their shut-off states in order that lubricating oil flows alternately between the outdoor units (2A, 2B) in heating operation, and holds the downstream sides of the oil equalization mechanisms (9A, 9B) in low-pressure condition. In detail, the oil equalizing control means (81) opens the pressure equalizing valve (SVB1) and the first oil equalizing valve (SVO1) with closing the respective bypass valves (SVY1, SVY2) and the second oil equalizing valve (SVO2) and simultaneously adjusts the outdoor motor-operated expansion valve (25) of the second outdoor unit (2B) into a small opening, thereby conducting lubricating oil from the first outdoor unit (2A) to the second outdoor unit (2B). Further, the oil equalizing control means (81) opens the pressure equalizing valve (SVB1) and the second oil equalizing valve (SVO2) with closing the respective bypass valves (SVY1, SVY2) and the first oil equalizing valve (SVO1) and simultaneously adjusts the outdoor motor-operated expansion valve (25) of the first outdoor unit (2A) into a small opening, thereby conducting lubricating oil from the second outdoor unit (2B) to the first outdoor unit (2A).

Operations of Embodiment 4

First, in either of cooling operation and heating operation, the pressure equalizing valve (SVB1) is opened when both the outdoor units (2A, 2B) are operated. In cooling operation, high-pressure gas refrigerant flows through both the outdoor heat exchangers (24) at an approximately uniform flow rate. In heating operation, low-pressure gas refrigerant flows through both the outdoor heat exchangers (24) at an approximately uniform flow rate.

For example, when a capacity of the second outdoor unit (2B) becomes large as compared with the load in cooling operation, a part of refrigerant discharged from the compression mechanism (21) passes through the pressure equalizing line (6E) and then flows into the outdoor heat exchanger (24) of the first outdoor unit (2A).

On the other hand, when a capacity of the second outdoor unit (2B) becomes large as compared with the load in heating operation, a part of refrigerant flows from the outdoor heat exchanger (24) of the first outdoor unit (2A) to the oil equalizing line (6E) and then is suctioned into the compression mechanism (21) of the second outdoor unit (2B).

When the second outdoor unit (2B) is deactivated in cooling operation, the pressure equalizing valve (SVB1) is fully closed. When the second outdoor unit (2B) is deactivated in heating operation, the pressure equalizing valve (SVB1) is held opened.

Further, when the second outdoor unit (2B) is deactivated in heating operation, the gas stop valve (SVR1) is closed. When the second outdoor unit (2B) is deactivated in cooling operation and heating operation, the outdoor motor-operated expansion valve (25) of the second outdoor unit (2B) is fully closed. Thereby, it is prevented that liquid refrigerant is stored in the second outdoor unit (2B) in deactivation.

In the above cooling operation and heating operation, the bypass valves (SVY1, SVY2) and the oil equalizing valves (SVO1, SVO2) are closed.

As one of features of this invention, the present embodiment is so composed that oil equalizing operation is performed in either of cooling operation and heating operation so that an amount of lubricating oil is equalized between both the compression mechanisms (21) in each outdoor unit (2A, 2B).

More specifically, in cooling operation, oil equalizing operation is performed as shown in arrows T1 and T2 of FIG. 13.

First, the first oil equalizing valve (SVO1) and the second bypass valve (SVY2) are opened with the pressure equalizing valve (SVB1) closed and the second oil equalizing valve (SVO2) and the first bypass valve (SVY1) are closed.

In this state, as shown in the arrow T1 of FIG. 13, a surplus part out of lubricating oil stored in the oil separator (43) of the first outdoor unit (2A) passes from the first oil equalizing bypass pipe (93) to the pressure equalizing line (6E), flows into the gas line (6B) via the second gas bypass passage (96) and is then introduced into the compression mechanism (21) of the second outdoor unit (2B). In this manner, lubricating oil is conducted from the first outdoor unit (2A) to the second outdoor unit (2B).

Thereafter, the second oil equalizing valve (SVO2) and the first bypass valve (SVY1) are opened with the pressure equalizing valve (SVB1) closed, and the first oil equalizing valve (SVO1) and the second bypass valve (SVY2) are closed.

In this state, as shown in the arrow T2 of FIG. 13, a surplus part out of lubricating oil stored in the oil separator (48) of the second outdoor unit (2B) passes from the second oil equalizing bypass pipe (94) to the pressure equalizing line (6E), flows into the gas line (6A) via the first gas bypass passage (95) and is then introduced into the compression mechanism (21) of the first outdoor unit (2A). In this manner, lubricating oil is conducted from the second outdoor unit (2B) to the first outdoor unit (2A).

Oil equalization is performed between the outdoor units (2A, 2B) in such a manner that the above operation is repeated.

On the other hand, in heating operation, oil equalizing operation is performed as shown in arrows T3 and T4 of FIG. 13.

First, the first oil equalizing valve (SVO1) and the pressure equalizing valve (SVB1) are opened with the first bypass valve (SVY1) and the second bypass valve (SVY2) closed, and the second oil equalizing valve (SVO2) is closed. Then, the opening of the motor-operated expansion valve (25) of the second outdoor unit (2B) is set to be slightly small so that the second outdoor unit (2B) side of the pressure equalizing line (6E) is held in a low pressure.

In this state, as shown in the arrow T3 of FIG. 13, a surplus part out of lubricating oil stored in the oil separator (43) of the first outdoor unit (2A) passes from the first oil equalizing bypass pipe (93) to the pressure equalizing line (6E) and is then introduced into the compression mechanism (21) of the second outdoor unit (2B). In this manner, lubricating oil is conducted from the first outdoor unit (2A) to the second outdoor unit (2B).

Thereafter, the second oil equalizing valve (SVO2) and the pressure equalizing valve (SVB1) are opened with the first bypass valve (SVY1) and the second bypass valve (SVY2) closed, and the first oil equalizing valve (SVO1) is closed. Then, the opening of the motor-operated expansion valve (25) of the first outdoor unit (2A) is set to be slightly small so that the first outdoor unit (2A) side of the pressure equalizing line (6E) is held in a low pressure.

In this state, as shown in the arrow T4 of FIG. 13, a surplus part out of lubricating oil stored in the oil separator (43) of the second outdoor unit (2B) passes from the second oil equalizing bypass pipe (94) to the pressure equalizing line (6E) and is then introduced into the compression mechanism (21) of the first outdoor unit (2A). In this manner, lubricating oil is conducted from the second outdoor unit (2B) to the first outdoor unit (2A).

Oil equalization is performed between the outdoor units (2A, 2B) in such a manner that the above operation is repeated.

The above oil equalizing operation is made for 2 to 3 minutes in every 2 to 3 hours, and is also made after the completion of oil backing operation and after the completion of defrosting operation.

In addition, in each of the compression mechanisms (21), an amount of lubricating oil is balanced between the compressors (2a, 2b) as in Embodiment 3.

Effects of Embodiment 4

As described above, according to the present embodiment, since lubricating oil is conducted from the high-pressure side as the discharge side of the compression mechanism (21) of one outdoor unit (2A, 2B) to the low-pressure side of the other outdoor unit (2A, 2B), there can be securely prevented oil collecting phenomena that lubricating oil is collected to one of the outdoor units (2A, 2B).

As a result, lack in lubricating oil can be securely prevented so that secure normal temperature control operation can be continued.

Further, since surplus lubricating oil is discharged from the oil separator (43), oil collecting phenomena can be securely eliminated so that normal temperature control operation can be continued more securely.

Furthermore, since oil equalizing operation is performed in a cooling cycle at the cooling operation and in a heating cycle at the heating operation, oil equalizing operation is performed in the same cycle as in normal temperature control operation. Accordingly, no variation in refrigerant flow or the like occurs so that oil equalizing operation can be readily performed.

<Other Modifications>

In Embodiment 1 of FIG. 1, Embodiment 3 of FIG. 8 and Embodiment 4 of FIG. 13, two compressors (2a, 2b) are provided. In this invention, however, three or more compressors (2a, 2b, ...) can be provided.

Further, in Embodiment 2 of FIG. 7 and Embodiment 4 of FIG. 13, two outdoor units (2A, 2B) are provided. In this invention, however, three or more outdoor units (2A, 2B, ...) can be provided.

Each of the above embodiments can perform both cooling operation and heating operation. However, this invention may relate to cooling-only apparatus or heating-only apparatus.

In Embodiment 4, the respective bypass valves (SVY1, SVY2) and the respective oil equalizing valves (SVO1, SVO2) may be opened together and oil equalizing operation may be simultaneously performed in both the outdoor units (2A, 2B).

Further, in Embodiment 4, oil equalizing operation may be preformed at the same time of defrosting operation made using the pressure equalizing line (6E) in heating operation.

In detail, when the outdoor heat exchanger (24) of the first outdoor unit (2A) is frosted, the first outdoor unit (2A) and second outdoor unit (2B) are operated in a cooling cycle, the first bypass valve (SVY1) is opened, the second bypass valve (SVY2) is closed, the gas stop valve (SVR1) is opened, and the pressure equalizing valve (SVB1) and the outdoor motor-operated expansion valve (25) of the second outdoor unit (2B) are fully closed.

As a result, while high-pressure gas refrigerant discharged from the compressor (21) of the first outdoor unit (2A) is fed to the frosted outdoor heat exchanger (24), high-pressure gas refrigerant discharged from the compressor (21) of the second outdoor unit (2B) is fed to the compressor (21) of the first outdoor unit (2A) through the pressure equalizing line (6E), the first bypass passage (95) and the gas passage (62). Then, the temperature of the suctioned gas refrigerant of the compressor (21) of the first outdoor unit (2A) is increased so that the temperature of the discharged gas refrigerant is increased, thereby promptly performing the defrosting of the first outdoor unit (2A).

At this time, by opening the second oil equalizing valve (SVO2), oil equalizing operation is simultaneously performed for conducting lubricating oil from the second outdoor unit (2B) to the first outdoor unit (2A).

On the contrary, when the second outdoor unit (2B) is frosted, the second bypass valve (SVY2) is opened, the first bypass valve (SVY1) is closed, and defrosting operation is made in the opposite manner to the above operation. Thus, high-pressure gas refrigerant discharged from the compressor (21) of the first outdoor unit (2A) is fed to the compressor (21) of the second outdoor unit (2B) through the pressure equalizing line (6E), the second bypass passage (96) and the gas passage (62). Then, the temperature of the discharged gas refrigerant of the compressor (21) of the second outdoor unit (2B) is increased so that the defrosting of the second outdoor unit (2B) is promptly performed.

At this time, by opening the first oil equalizing valve (SVO1), oil equalizing operation is simultaneously performed for conducting lubricating oil from the first outdoor unit (2A) to the second outdoor unit (2B).

Furthermore, the oil discharge mechanism (40) and the oil equalization mechanisms (9A, 9B) are not limited to the structures of the above embodiments.

In Embodiment 3 of FIG. 8, each outdoor unit (2A, 2B) has two compressors (2a, 2b). However, either one of the outdoor units (2A, 2B) may have two compressors (2a, 2b).

The differential pressure control mechanism (4a), illustrated in Modifications 1 to 3 of Embodiment 3 shown in FIGS. 9 and 10, is so set that the suction pipes (2d) are different in pressure loss from each other. However, the differential pressure control mechanism (4a) may be so controlled that the suction pipes (2d) are equal in pressure loss to each other and the compressors (2a, 2b) are different in operating condition from each other, and thus both the compressors (2a, 2b) may be different in inner pressure from each other thereby performing oil equalization.

[Industrial Applicability]

As described above, since an amount of lubricating oil can be balanced, a refrigerating apparatus of this invention is suitable for air conditioner or the like having a plurality of compressors.

I claim:

1. A refrigerating apparatus comprising: a refrigerant circulation system having a closed circuit for circulating refrigerant, to which a compression mechanism, a thermal-source-side heat exchanger, an expansion mechanism and a used-side heat exchanger are connected, wherein said compression mechanism has a plurality of compressors connected in parallel with one another, each of said compressors has an oil discharge mechanism, and said oil discharge mechanism introduces, when lubricating oil stored in a casing of a compressor out of said compressors exceeds a set amount, the excess of lubricating oil to a low pressure part inside of said compressor and discharges the excess of lubricant oil together with a refrigerant into said refrigerant circulation system outside of said compressor.

2. A refrigerating apparatus comprising:

a refrigerant circulation system having a closed circuit for circulating refrigerant which is connected to:

a plurality of thermal source units each of which has at least a compression mechanism and a thermal-source-side heat exchanger and which are connected in parallel with one another; and a user unit which has at least a used-side heat exchanger, wherein the refrigerant is circulated in such a manner that said refrigerant discharged from said compression mechanisms is condensed by one of said heat exchangers, is expanded by said expansion mechanism and is then evaporated by the other heat exchanger, said refrigerating apparatus comprising an oil discharge mechanism, provided in each of said compression mechanisms, and said oil discharge mechanism introduces, when lubricating oil stored in one of said compression mechanisms exceeds a set amount, the excess of lubricating oil to a low pressure part inside of said compression mechanism and discharges the excess of lubricant oil together with the refrigerant into said refrigerant circulation system outside of said compression mechanism.

3. A refrigerating apparatus according to claim 2, wherein each of said compression mechanisms has a single compressor provided with said oil discharge mechanism.

4. A refrigerating apparatus according to claim 2, wherein said compression mechanism of at least one of said thermal source units has a plurality of compressors connected in parallel with one another.

5. A refrigerating apparatus according to claim 4, wherein said compression mechanism having said plural compressors includes a differential pressure control mechanism which has an oil equalizing pipe connecting said respective compressors and in which differential pressure is generated among said respective compressors thereby equalizing an amount of lubricating oil thereamong.

6. A refrigerating apparatus according to claim 5, wherein said compression mechanism having said plural compressors includes said oil discharge mechanism only in said compressor located on the most downstream side of said differential pressure control mechanism through which lubricating oil flows.

7. A refrigerating apparatus according to claim 1 or 2, wherein an oil separator is disposed on the discharge side of said compression mechanism.

8. A refrigerating apparatus according to claim 1 or 4, wherein said compression mechanism having said plural compressors includes:

an oil separator provided at a confluence of the discharge sides of said compressors; and an oil backing pipe which is connected at an end thereof to said oil separator and is connected at the other end thereof upstream from a branch point of the suction sides of said compressors.

9. A refrigerating apparatus according to claim 1 or 4, wherein said compression mechanism having said plural compressors includes:

oil separators provided on the discharge sides of said compressors respectively; and oil backing pipes which are each connected at an end thereof to corresponding one of said oil separators and are each connected at the other end thereof upstream from a branch point of the suction sides of said compressors.

10. A refrigerating apparatus according to claim 1 or 4, wherein said compression mechanism having said plural compressors includes:

oil separators provided on the discharge sides of said compressors respectively; and oil backing pipes which are each connected at an end thereof to said oil separator of said corresponding compressor and are each connected at the other end thereof to the suction side of the other compressor.

11. A refrigerating apparatus according to claim 2, further comprising oil equalization mechanisms for conducting surplus lubricating oil discharged from said oil discharge mechanism of said compression mechanism of each said thermal source unit to the suction side of said compression mechanism of the other thermal source unit.

* * * * *